United States Patent
Shlissel et al.

(10) Patent No.: US 9,118,941 B2
(45) Date of Patent: Aug. 25, 2015

(54) SCRAMBLED PACKET STREAM PROCESSING

(75) Inventors: Moshe Shlissel, Jerusalem (IL); Kevin Murray, Fordingbridge (GB); Colin Davies, Fordingbridge (GB)

(73) Assignee: Cisco Technology Inc., San Jose, CA (US)

( * ) Notice: Subject to any disclaimer, the term of this patent is extended or adjusted under 35 U.S.C. 154(b) by 3490 days.

(21) Appl. No.: 10/498,888

(22) PCT Filed: Feb. 17, 2003

(86) PCT No.: PCT/IL03/00124
§ 371 (c)(1),
(2), (4) Date: Mar. 14, 2005

(87) PCT Pub. No.: WO03/071799
PCT Pub. Date: Aug. 28, 2003

(65) Prior Publication Data
US 2005/0157714 A1    Jul. 21, 2005

Related U.S. Application Data

(60) Provisional application No. 60/360,635, filed on Mar. 1, 2002.

(30) Foreign Application Priority Data

Feb. 22, 2002   (GB) .................................. 0204190.3

(51) Int. Cl.
| | |
|---|---|
| *H04N 5/93* | (2006.01) |
| *H04N 21/238* | (2011.01) |
| *H04N 7/167* | (2011.01) |
| *H04N 21/432* | (2011.01) |

(52) U.S. Cl.
CPC .............. *H04N 21/238* (2013.01); *H04N 7/167* (2013.01); *H04N 21/4325* (2013.01); *H04N 7/1675* (2013.01)

(58) Field of Classification Search
None
See application file for complete search history.

(56) References Cited

U.S. PATENT DOCUMENTS

| | | |
|---|---|---|
| 5,517,502 A | 5/1996 | Bestler et al. |
| 6,028,932 A | 2/2000 | Park |
| 6,445,738 B1 * | 9/2002 | Zdepski et al. .......... 375/240.01 |
| 2003/0237089 A1 * | 12/2003 | Wajs ............................. 725/31 |

FOREIGN PATENT DOCUMENTS

| | | |
|---|---|---|
| EP | 1328119 | 7/2003 |
| WO | 97/40623 | 10/1997 |
| WO | 9740623 | 10/1997 |
| WO | 0056068 | 9/2000 |
| WO | 02/15579 | 2/2002 |
| WO | 0223897 | 3/2002 |

OTHER PUBLICATIONS

English Abstract of WO 0223897 Dated Mar. 21, 2002.

* cited by examiner

*Primary Examiner* — Heather Jones
(74) *Attorney, Agent, or Firm* — Hahn Loeser & Parks LLP

(57) ABSTRACT

A method for processing a packet-based scrambled stream, the method including receiving a plurality of scrambled packets in a packet stream, descrambling any of the scrambled packets, and transmitting a modified packet stream including at least one of the descrambled packets and at least one of the scrambled packets. Related apparatus and methods are also described.

89 Claims, 16 Drawing Sheets

SCRAMBLED PACKET STREAM PROCESSING

CROSS-REFERENCE TO RELATED APPLICATIONS

The present application is a 35 USC §371 application of PCT/IL03/00124, filed on 17 Feb. 2003 and entitled "Scrambled Packet Stream Processing", which was published on 28 Aug. 2003 in the English language with International Publication Number WO 03/071799 A2. The present application claims the benefit of the filing date of U.S. Provisional Patent Application Ser. No. 60/360,635, filed Mar. 1, 2002, and titled "Processing of Scrambled Streams," and U.K. Patent Application No. 0204190.3, filed Feb. 22, 2002, and titled "Processing of Scrambled Streams," both of which are incorporated herein by reference in their entirety.

FIELD OF THE INVENTION

The present invention relates to packet-based communications systems in general, and more particularly to processing scrambled packet streams.

BACKGROUND OF THE INVENTION

Systems for receiving digital television signals are well known. In one common end-user configuration, such as may be seen in FIG. 1, a home video server 100 employs a tuner 102 to receive a digital television broadcast signal via a satellite receiver 104. The signal data, such as a scrambled MPEG-2 packet stream, may be stored on a storage medium 110, descrambled and decoded by an MPEG decoder 106 for viewing on a television 108, and transmitted in scrambled form via a transmitter 112 to a client 114. Client 114 may similarly descramble and decode the scrambled packet stream at an MPEG decoder 116 for viewing on a television 118.

When transmitting to client 114, it is advantageous to transmit the MPEG-2 packet stream in scrambled form in support of anti-piracy measures. However, current solutions for providing trick mode support to clients, such as fast-forward viewing, require a) changing the transmission rate, or b) descrambling the packet stream at the video server, modifying the video content to support the trick mode, and either b1) transmitting the descrambled and modified video to the client, or b2) rescrambling and transmitting the modified video to the client. Unfortunately, the existing bandwidth between the server and the client is often insufficient to support an accelerated transmission rate, transmitting descrambled video to the client defeats anti-piracy measures, and existing home video servers are generally incapable of scrambling, and the cost and complexity of adding scrambling functionality to existing hardware, or replacing existing hardware with hardware having scrambling capability, may be prohibitive.

Trick mode support for scrambled packet streams that takes advantage of existing bandwidth, that provides for transmission of scrambled packet streams to clients, and that does not require rescrambling at the end-user video server would therefore be advantageous.

SUMMARY OF THE INVENTION

The present invention, in preferred embodiments thereof, provides for scrambled packet stream processing in which portions of a scrambled packet stream are removed or descrambled and altered, such as in support of digital video trick modes, while preserving a valid video stream that includes scrambled portions that have not been altered.

In one aspect of a preferred embodiment of the present invention a method is provided for processing a packet-based scrambled stream, the method including receiving a plurality of scrambled packets in a packet stream, descrambling any of the scrambled packets, and transmitting a modified packet stream including at least one of the descrambled packets and at least one of the scrambled packets.

In another aspect of a preferred embodiment of the present invention the method further includes moving a data segment within a payload of any of the packets from a first location within the payload to a second location within the payload.

In another aspect of a preferred embodiment of the present invention the method further includes overwriting at least a portion of the first location.

In another aspect of a preferred embodiment of the present invention the overwriting step includes overwriting with any of zeroes, stuffing bytes, and padding bytes.

In another aspect of a preferred embodiment of the present invention the method further includes overwriting data designated as undesirable within a payload of any of the packets.

In another aspect of a preferred embodiment of the present invention any of the overwriting steps includes overwriting with any of zeroes, stuffing bytes, and padding bytes.

In another aspect of a preferred embodiment of the present invention the method further includes changing the value of at least one byte of any of the packets in accordance with a predefined processing decision.

In another aspect of a preferred embodiment of the present invention the changing step includes changing the byte in any of the descrambled packets.

In another aspect of a preferred embodiment of the present invention the method further includes changing the value of at least one bit of any of the packets in accordance with a predefined processing decision.

In another aspect of a preferred embodiment of the present invention the changing step includes changing the bit in any of the descrambled packets.

In another aspect of a preferred embodiment of the present invention the method further includes dropping any of the packets from the received packet stream in accordance with a predefined processing decision.

In another aspect of a preferred embodiment of the present invention the receiving step includes receiving a video stream including a plurality of independent video elements and at least one video element that is dependent on any of the independent video elements, and the method further includes removing any of the dependent video elements from the video stream, thereby resulting in the modified packet stream.

In another aspect of a preferred embodiment of the present invention the method further includes modifying any of the video elements to maintain the validity of the processed video stream with respect to a protocol.

In another aspect of a preferred embodiment of the present invention the method further includes holding any of the packets until the packets collectively comprise a predefined processing unit, and the transmitting step includes transmitting the held packets including the processing unit.

In another aspect of a preferred embodiment of the present invention the method further includes holding any of the packets until the packets collectively comprise the data of at least one picture, and the transmitting step includes transmitting the held packets including the data of the picture.

In another aspect of a preferred embodiment of the present invention the method further includes retransmitting the held packets at least one additional time.

In another aspect of a preferred embodiment of the present invention the retransmitting step includes retransmitting a sufficient number of times in order to effect a predetermined slow-down factor of a display of the picture.

In another aspect of a preferred embodiment of the present invention the retransmitting step includes retransmitting where the picture is an MPEG-protocol B-picture.

In another aspect of a preferred embodiment of the present invention the method further includes transmitting a sufficient number of null pictures in order to effect a predetermined slow-down factor of a display of the picture.

In another aspect of a preferred embodiment of the present invention the transmitting null pictures step includes transmitting where the picture is either of an MPEG-protocol P-picture and an MPEG-protocol I-picture.

In another aspect of a preferred embodiment of the present invention the method further includes converting any of the packets including data from multiple pictures into a plurality of individual packets, each including data from only one of the multiple pictures.

In another aspect of a preferred embodiment of the present invention the method further includes modifying any of the packets to maintain the slow-down factor.

In another aspect of a preferred embodiment of the present invention the method further includes modifying any of the packets to maintain the validity of the packet stream with respect to an MPEG protocol.

In another aspect of a preferred embodiment of the present invention a method is provided for providing a processed MPEG video stream, the method including receiving an MPEG video stream as a plurality of scrambled packets including data that are designated as desirable data and data that are designated as undesirable data, descrambling any of the scrambled packets, and transmitting a processed MPEG video stream including at least one of the descrambled packets and at least one of the scrambled packets.

In another aspect of a preferred embodiment of the present invention the method further includes removing any of the undesirable data from any of the descrambled packets, thereby resulting in a modified descrambled packet, and where the transmitting step includes transmitting the modified descrambled packet.

In another aspect of a preferred embodiment of the present invention the method further includes designating as desirable data any of I-picture data and header data that is necessary to maintain the validity of the processed MPEG video stream with respect to an MPEG protocol.

In another aspect of a preferred embodiment of the present invention the method further includes designating as undesirable data any of P-picture data, B-picture data, and header data that not is necessary to maintain the validity of the processed MPEG video stream with respect to an MPEG protocol.

In another aspect of a preferred embodiment of the present invention the method further includes modifying any header information in the processed MPEG video stream to maintain the validity of the processed MPEG video stream with respect to an MPEG protocol.

In another aspect of a preferred embodiment of the present invention the removing step includes dropping any of the packets having only the undesirable data.

In another aspect of a preferred embodiment of the present invention the removing step includes overwriting at least a portion of the undesirable data with any of zeroes, stuffing bytes, and padding bytes.

In another aspect of a preferred embodiment of the present invention the removing step includes padding an adaptation field within any of the packets having the undesirable data with a sufficient number of bytes to overwrite at least a portion of the undesirable data.

In another aspect of a preferred embodiment of the present invention the removing step includes moving the desirable data within a payload of any of the packets from a first location within the payload to a second location within the payload.

In another aspect of a preferred embodiment of the present invention the removing step includes overwriting at least a portion of the first location.

In another aspect of a preferred embodiment of the present invention the removing step includes overwriting at least a portion of the first location with any of zeroes, stuffing bytes, and padding bytes.

In another aspect of a preferred embodiment of the present invention the removing step includes padding an adaptation field within the packet with a sufficient number of bytes to overwrite at least a portion of the first location.

In another aspect of a preferred embodiment of the present invention the removing step includes overwriting a PES header in any of the packets with PES header stuffing bytes, where the PES header is followed by the desirable data, and setting a flags byte of the PES header to indicate that no PES header options are present.

In another aspect of a preferred embodiment of the present invention the method further includes generating and inserting into the processed MPEG video stream a TS packet including a generated PES header where the PES header is required to maintain the validity of the processed MPEG video stream with respect to an MPEG protocol.

In another aspect of a preferred embodiment of the present invention the method further includes generating and inserting into the processed MPEG video stream a TS packet including a generated PCR where the PCR is required to maintain the validity of the processed MPEG video stream with respect to an MPEG protocol.

In another aspect of a preferred embodiment of the present invention the method further includes generating and inserting a sufficient number of null pictures into the processed MPEG video stream to achieve a predefined playback speed.

In another aspect of a preferred embodiment of the present invention the removing step includes, where any of the packets includes an ES sequence header, setting a bit_rate_value of the ES sequence header to a peak bit rate at which the processed MPEG video stream will be transmitted, and setting a vbv_buffer_size_value of the ES sequence header equal to that which is indicated for a Main Profile at Main Level.

In another aspect of a preferred embodiment of the present invention the removing step includes, where any of the packets includes a picture header of an I-picture, setting a temporal_reference value in the packet to zero setting a vbv_delay in the packet to indicate that no value is specified.

In another aspect of a preferred embodiment of the present invention the removing step includes, where any of the packets includes an adaptation field that may be removed without compromising the validity of the processed MPEG video stream, replacing a flags byte of the adaptation field with zeros, and replacing all remaining bytes of the adaptation field with stuffing bytes.

In another aspect of a preferred embodiment of the present invention a scrambled packet stream processor is provided including a descrambler operative to descramble any packet in a scrambled packet stream, a packet processor operative to perform at least one packet processing decision upon any of the packets resulting in any of generating a packet, deciding to drop any of the packets, altering any of the packets, and deciding to forward any of the packets from the stream, and a packet selector responsive to the decision and operative to perform any of inserting the generated packet into the stream, dropping any of the packets, and forwarding any of the packets, where the packet selector forwards at least one of the scrambled packets and at least one descrambled packet.

In another aspect of a preferred embodiment of the present invention a packet stream processing architecture is provided including a first packet buffer into which a first TS packet from a packet stream may be placed, a second packet buffer into which a second TS packet that follows the first TS packet in the packet stream may be placed, a first data pointer operative to indicate the location of the packet payload of the first packet, a second data pointer operative to indicate the location of the packet payload of the second packet, a first flag operative to indicate if the first packet should be transmitted in scrambled or descrambled form, and a second flag operative to indicate if the second packet should be transmitted in scrambled or descrambled form.

In another aspect of a preferred embodiment of the present invention the architecture further includes a PID filter operative to selectively place any of the packets into any of the buffers in accordance with predefined selection criteria.

In another aspect of a preferred embodiment of the present invention apparatus for processing a packet-based scrambled stream is provided including a descrambler operative to receive a plurality of scrambled packets in a packet stream and descramble any of the scrambled packets, and a packet selector operative to transmit a modified packet stream including at least one of the descrambled packets and at least one of the scrambled packets.

In another aspect of a preferred embodiment of the present invention the apparatus further includes a packet processor operative to modify any of the packets.

In another aspect of a preferred embodiment of the present invention the packet processor is operative to move a data segment within a payload of any of the packets from a first location within the payload to a second location within the payload.

In another aspect of a preferred embodiment of the present invention the packet processor is operative to overwrite at least a portion of the first location.

In another aspect of a preferred embodiment of the present invention the packet processor is operative to overwrite with any of zeroes, stuffing bytes, and padding bytes.

In another aspect of a preferred embodiment of the present invention the packet processor is operative to overwrite data designated as undesirable within a payload of any of the packets.

In another aspect of a preferred embodiment of the present invention the packet processor is operative to overwrite with any of zeroes, stuffing bytes, and padding bytes.

In another aspect of a preferred embodiment of the present invention the packet processor is operative to change the value of at least one byte of any of the packets in accordance with a predefined processing decision.

In another aspect of a preferred embodiment of the present invention the packet processor is operative to change the byte in any of the descrambled packets.

In another aspect of a preferred embodiment of the present invention the packet processor is operative to change the value of at least one bit of any of the packets in accordance with a predefined processing decision.

In another aspect of a preferred embodiment of the present invention the packet processor is operative to change the bit in any of the descrambled packets.

In another aspect of a preferred embodiment of the present invention the packet processor is operative to drop any of the packets from the received packet stream in accordance with a predefined processing decision.

In another aspect of a preferred embodiment of the present invention the stream includes a plurality of independent video elements and at least one video element that is dependent on any of the independent video elements, and the packet processor is operative to remove any of the dependent video elements from the video stream, thereby resulting in the modified packet stream.

In another aspect of a preferred embodiment of the present invention the packet processor is operative to modify any of the video elements to maintain the validity of the processed video stream with respect to a protocol.

In another aspect of a preferred embodiment of the present invention the packet processor is operative to hold any of the packets until the packets collectively comprise a predefined processing unit, and where the packet selector is operative to transmit the held packets including the processing unit.

In another aspect of a preferred embodiment of the present invention the packet processor is operative to hold any of the packets until the packets collectively comprise the data of at least one picture, and where the packet selector is operative to transmit the held packets including the data of the picture.

In another aspect of a preferred embodiment of the present invention the packet selector is operative to retransmit the held packets at least one additional time.

In another aspect of a preferred embodiment of the present invention the packet selector is operative to retransmit the held packets a sufficient number of times in order to effect a predetermined slow-down factor of a display of the picture.

In another aspect of a preferred embodiment of the present invention the packet selector is operative to retransmit where the picture is an MPEG-protocol B-picture.

In another aspect of a preferred embodiment of the present invention the packet selector is operative to transmit a sufficient number of null pictures in order to effect a predetermined slowdown factor of a display of the picture.

In another aspect of a preferred embodiment of the present invention the packet selector is operative to transmit where the picture is either of an MPEG-protocol P-picture and an MPEG-protocol I-picture.

In another aspect of a preferred embodiment of the present invention the packet processor is operative to convert any of the packets including data from multiple pictures into a plurality of individual packets, each including data from only one of the multiple pictures.

In another aspect of a preferred embodiment of the present invention the packet processor is operative to modify any of the packets to maintain the slowdown factor.

In another aspect of a preferred embodiment of the present invention the apparatus further includes modifying any of the packets to maintain the validity of the packet stream with respect to an MPEG protocol.

In another aspect of a preferred embodiment of the present invention apparatus is provided for providing a processed MPEG video stream including a descrambler operative to receive an MPEG video stream as a plurality of scrambled packets including data that are designated as desirable data and data that are designated as undesirable data and descramble any of the scrambled packets, and a packet selector operative to transmit a processed MPEG video stream including at least one of the descrambled packets and at least one of the scrambled packets.

In another aspect of a preferred embodiment of the present invention the apparatus further includes a packet processor operative to remove any of the undesirable data from any of the descrambled packets, thereby resulting in a modified descrambled packet, and where the packet selector is operative to transmit the modified descrambled packet.

In another aspect of a preferred embodiment of the present invention the desirable data includes any of I-picture data and header data that is necessary to maintain the validity of the processed MPEG video stream with respect to an MPEG protocol.

In another aspect of a preferred embodiment of the present invention the undesirable data includes any of P-picture data, B-picture data, and header data that not is necessary to maintain the validity of the processed MPEG video stream with respect to an MPEG protocol.

In another aspect of a preferred embodiment of the present invention the packet processor is operative to modify any header information in the processed MPEG video stream to maintain the validity of the processed MPEG video stream with respect to an MPEG protocol.

In another aspect of a preferred embodiment of the present invention the packet processor is operative to drop any of the packets having only the undesirable data.

In another aspect of a preferred embodiment of the present invention the packet processor is operative to overwrite at least a portion of the undesirable data with any of zeroes, stuffing bytes, and padding bytes.

In another aspect of a preferred embodiment of the present invention the packet processor is operative to pad an adaptation field within any of the packets having the undesirable data with a sufficient number of bytes to overwrite at least a portion of the undesirable data.

In another aspect of a preferred embodiment of the present invention the packet processor is operative to move the desirable data within a payload of any of the packets from a first location within the payload to a second location within the payload.

In another aspect of a preferred embodiment of the present invention the packet processor is operative to overwrite at least a portion of the first location.

In another aspect of a preferred embodiment of the present invention the packet processor is operative to overwrite at least a portion of the first location with any of zeroes, stuffing bytes, and padding bytes.

In another aspect of a preferred embodiment of the present invention the packet processor is operative to pad an adaptation field within the packet with a sufficient number of bytes to overwrite at least a portion of the first location.

In another aspect of a preferred embodiment of the present invention the packet processor is operative to overwrite a PES header in any of the packets with PES header stuffing bytes, where the PES header is followed by the desirable data, and set a flags byte of the PES header to indicate that no PES header options are present.

In another aspect of a preferred embodiment of the present invention the packet processor is operative to generate and insert into processed MPEG video stream a TS packet including a generated PES header where the PES header is required to maintain the validity of the processed MPEG video stream with respect to an MPEG protocol.

In another aspect of a preferred embodiment of the present invention the packet processor is operative to generate and insert into the processed MPEG video stream a TS packet including a generated PCR where the PCR is required to maintain the validity of the processed MPEG video stream with respect to an MPEG protocol.

In another aspect of a preferred embodiment of the present invention the packet processor is operative to generate and insert a sufficient number of null pictures into the processed MPEG video stream to achieve a predefined playback speed.

In another aspect of a preferred embodiment of the present invention the packet processor is operative to, where any of the packets includes an ES sequence header, set a bit_rate_value of the ES sequence header to a peak bit rate at which the processed MPEG video stream will be transmitted, and set a vbv_buffer_size_value of the ES sequence header equal to that which is indicated for a Main Profile at Main Level.

In another aspect of a preferred embodiment of the present invention the packet processor is operative to, where any of the packets includes a picture header of an I-picture, set a temporal_reference value in the packet to zero set a vbv_delay in the packet to indicate that no value is specified.

In another aspect of a preferred embodiment of the present invention the packet processor is operative to, where any of the packets includes an adaptation field that may be removed without compromising the validity of the processed MPEG video stream, replace a flags byte of the adaptation field with zeros, and replace all remaining bytes of the adaptation field with stuffing bytes.

It is appreciated throughout the specification and claims that references to modifying data may be understood as referring to data modification at the bit or byte level.

The disclosures of all patents, patent applications, and other publications mentioned in this specification and of the patents, patent applications, and other publications cited therein are hereby incorporated by reference in their entirety.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Preferred embodiments of the present invention are now described with respect to MPEG-2 Elementary Streams and their transmission via MPEG-2 Transport Stream packets. It is noted, however, that the present invention is not limited to use with MPEG-2 streams and packets, and may be utilized in other packet-based communications systems.

Figure 1:
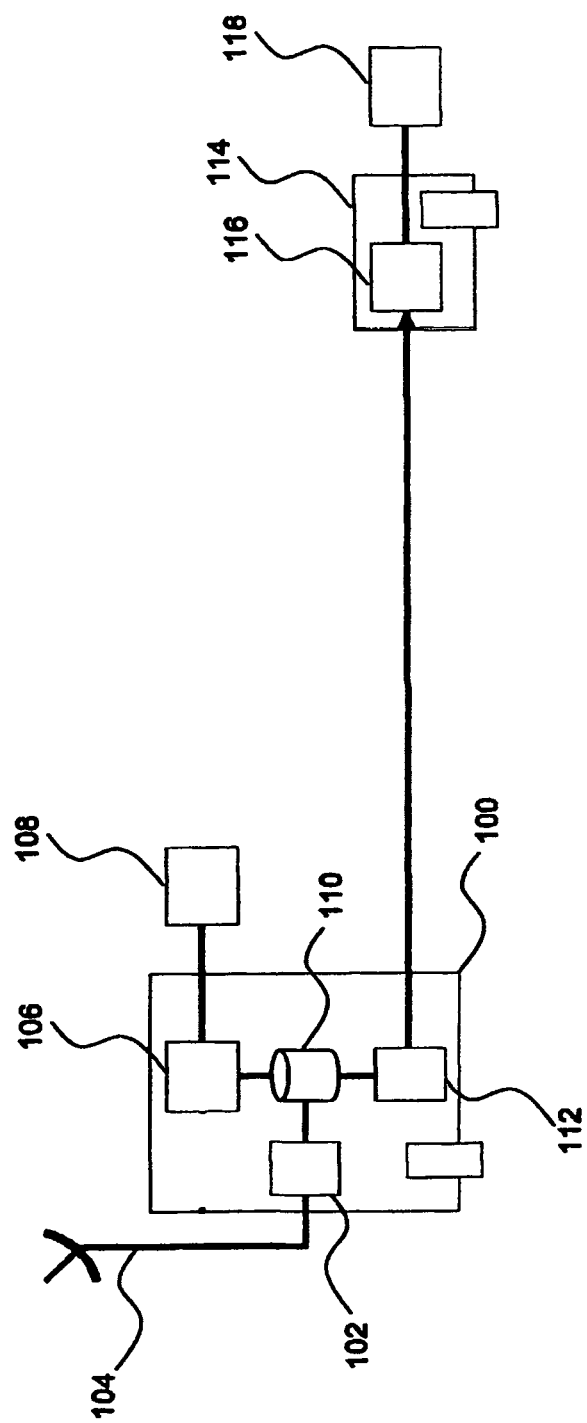
FIG. 1 is a simplified block diagram of a home video server architecture, useful in understanding the present invention.
Figure 2:
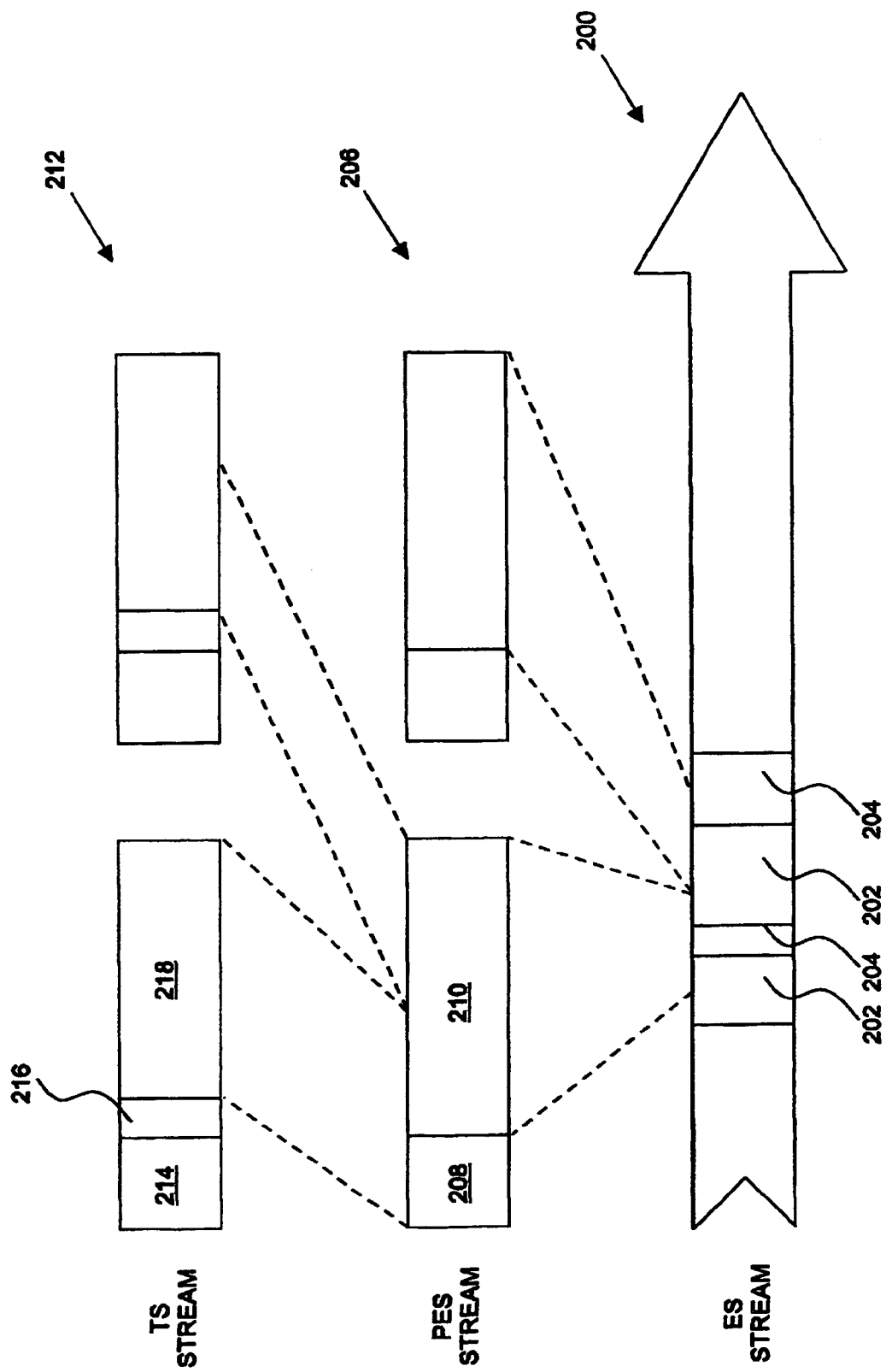
FIG. 2 is a simplified conceptual illustration of aspects of MPEG-2 streams and packets, useful in understanding the present invention.

Reference is now made to FIG. 2, which is a simplified conceptual illustration of aspects of MPEG-2 streams and packets, useful in understanding the present invention. In FIG. 2 an MPEG-2 Elementary Stream (ES) 200 is shown comprising an alternating stream of header portions 202 and video portions 204. ES 200 may be segmented, with each ES segment packetized into one or more Packetized Elementary Stream (PES) packets 206. Each PES packet 206 includes a PES header 208 followed by a PES payload 210, where each PES payload 210 stores a portion of an ES segment. Likewise, each PES packet 206 may be packetized into one or more Transport Stream (TS) packets 212. Each TS packet 212 includes a TS header 214, optionally followed by an adaptation field 216, and followed by a TS payload 218, where each TS packet 212 stores a portion of a PES packet 206.

Video portions 204 of ES 200 typically include groups of pictures (GOP), where each picture is encoded as one of three picture types: an Intra picture, or I-picture, where all the data for the picture are held within the picture itself; a Predicted picture, or P-picture, where some of the image data are predicted from the previous I or P picture; and a Bi-directionally Predicted picture, or B-picture, where some of the image data are predicted from the next I- or P-picture and some from the previous I- or P-picture. The structure of a GOP typically starts with an I-picture followed by a combination of P- and B-pictures, such as in the sequence IBBPBBPBBPBB, although for coding efficiency the order of the pictures within the GOP is typically different than presentation order of the pictures. Each coded picture is preceded by a start code, typically a bit string of 32 or more bits which starts byte-aligned with the 24-bit value 0x000001 and which may be preceded by any number of zero bytes. The start code provides information about the ES data that follow the start code. Individual pictures may vary in size, and are typically large enough to fill many TS packets. The start and end of a picture is not necessarily aligned with the start and end of a TS or PES packet.

PES header 208 may include timestamps which indicate when to decode or display pictures stored in PES payload 210. PES header 208 must start at the beginning of a TS packet, and may be followed by any part of the ES, including any part (i.e., beginning, middle, or end) of header portion 202 or video portion 204.

Figure 3:
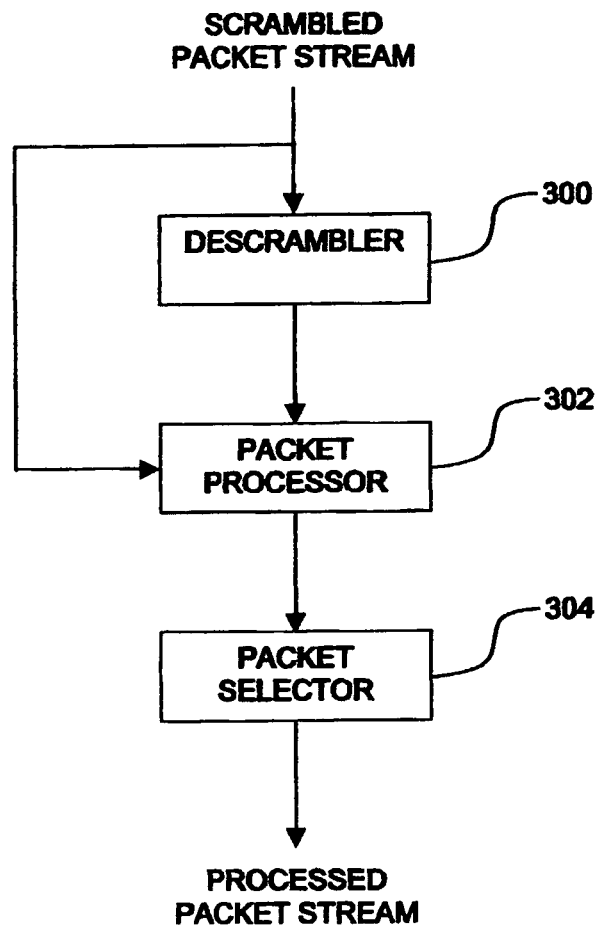
FIG. 3 is a simplified block diagram of a scrambled packet stream processor, constructed and operative in accordance with a preferred embodiment of the present invention.

Reference is now made to FIG. 3, which is a simplified block diagram of a scrambled packet stream processor, constructed and operative in accordance with a preferred embodiment of the present invention. In FIG. 3, a scrambled packet stream, such as an MPEG-2 TS packet stream, is descrambled by a descrambler 300 in accordance with conventional techniques. Each packet is then processed by a packet processor 302 where the decision is made to drop the packet, forward the packet as-is in scrambled or descrambled form, alter and forward the scrambled or descrambled packet, or insert generated packets into the scrambled packet stream. A preferred method of operation of packet processor 302 is described in greater detail hereinbelow with reference to FIGS. 4A-4J. The decision is then forwarded to a packet selector 304. Packets that have been altered, that are to be forwarded as-is in scrambled or descrambled form, or that have been generated are forwarded by packet processor 302 to packet selector 304 as well. For each scrambled packet in the scrambled packet stream, packet selector 304 generates a processed packet stream by carrying out the decision made by packet processor 302 and either drops the packet, forwards the scrambled packet as is, replaces the packet with its altered version or as-is descrambled version, and/or inserts a generated packet into the scrambled packet stream.

Reference is now made to FIGS. 4A-4J, which are simplified flowchart illustrations of packet processing decisions, such as may be carried out by packet processor 302 (FIG. 3), operative in accordance with a preferred embodiment of the present invention. The packet processing decisions shown in FIGS. 4A-4J are typically carried out in support of fast-forward viewing of MPEG-2 streams, in which a TS packet stream is purged of packets that do not include data that are designated as desirable, such as I-picture data (including I-picture header information) or other critical header data. TS packets that include desirable data are either forwarded unmodified and in scrambled form, or are modified, such as by purging data that are designated as undesirable, such as B- and P-picture data, or by changing header field values, and forwarded in descrambled form.

Figure 4A:
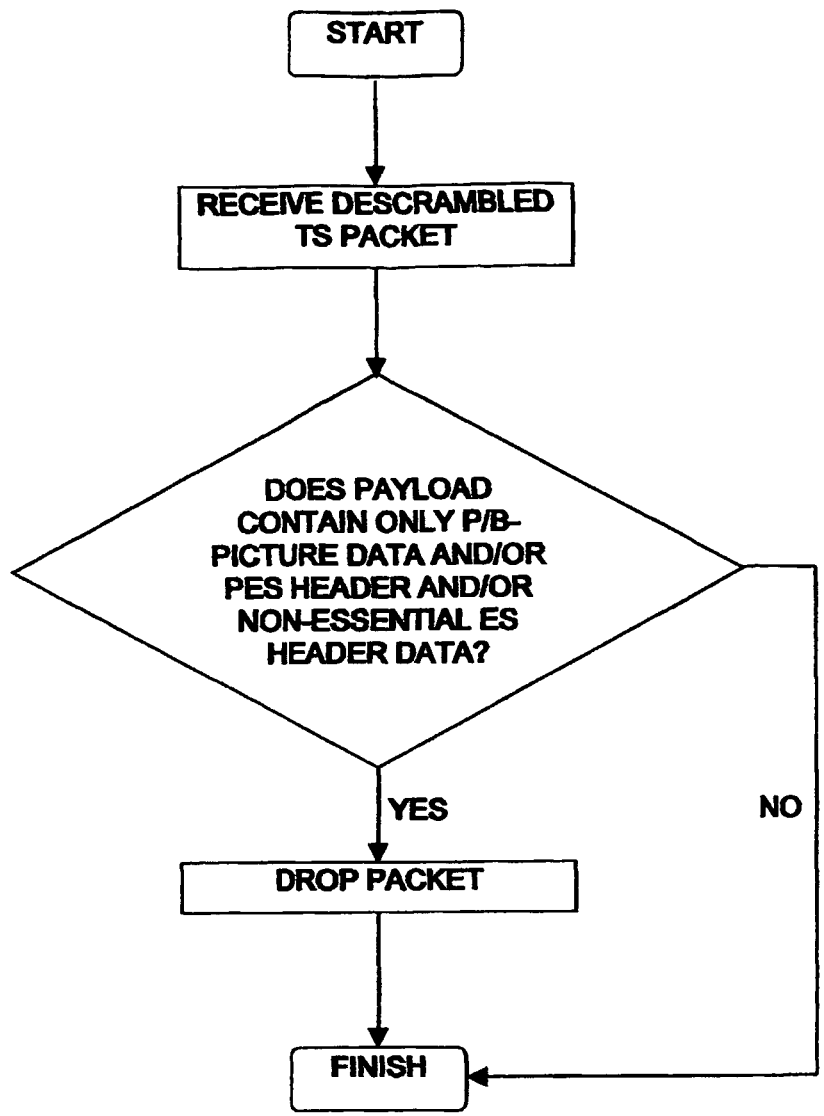
FIGS. 4A-4J are simplified flowchart illustrations of packet processing decisions, operative in accordance with a preferred embodiment of the present invention.

In FIG. 4A, a descrambled TS packet is received. If the TS packet payload contains only data that are designated as undesirable, such as P-picture or B-picture data, PES header information, ES header data that are not required to maintain the validity of the MPEG stream, or any combination thereof, the entire packet is dropped (i.e., removed) from the stream.

Figure 4B:
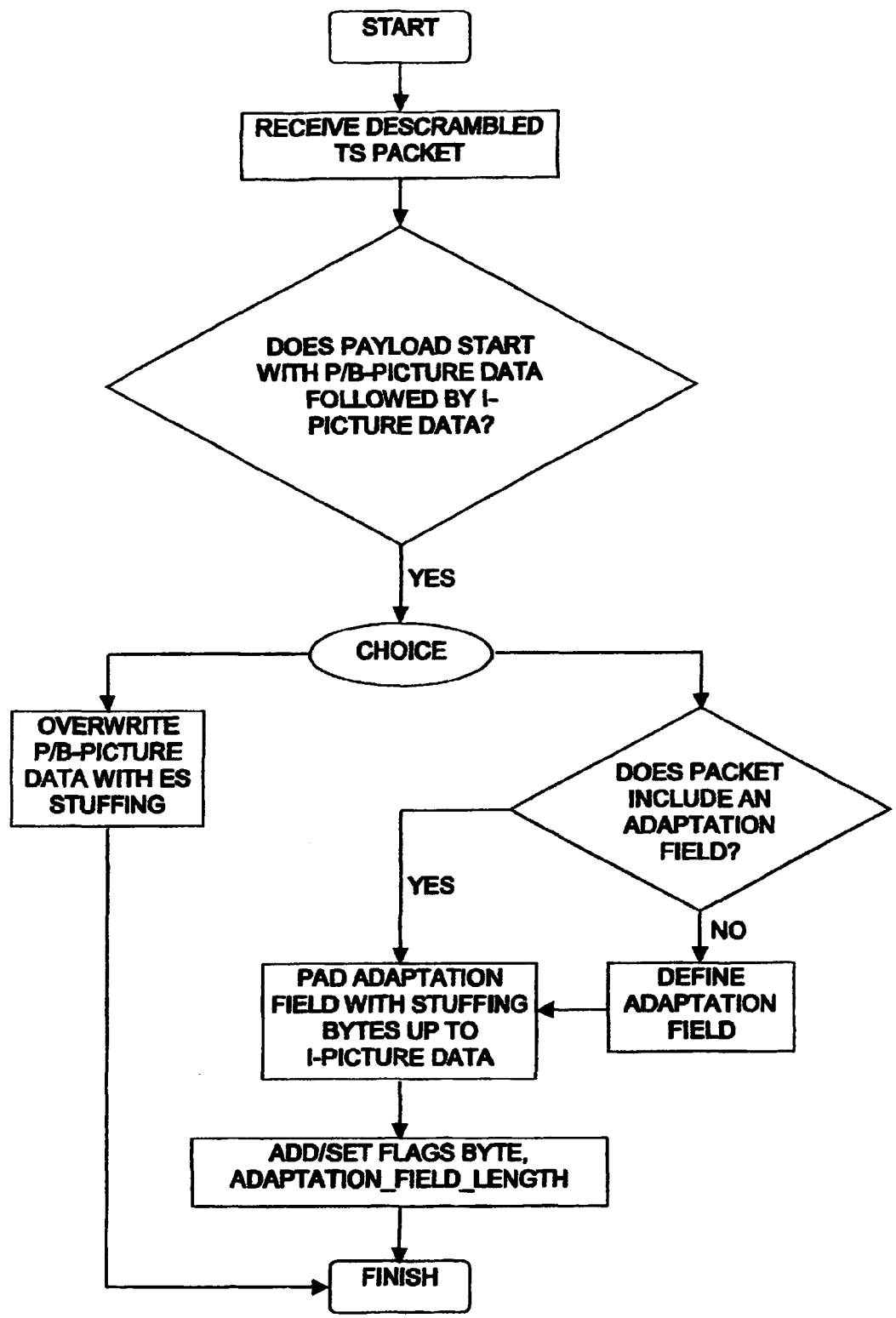

In FIG. 4B, a descrambled TS packet is received in which the TS packet payload starts with data that are designated as undesirable, such as P- or B-picture data, and that is followed by data that are designated as desirable, such as I-picture data. The P- or B-picture data may be removed by overwriting them at the bit or byte level with zeroes which represent ES stuffing bytes (i.e., 0x00) which are ignored by the MPEG decoder. Alternatively, if the TS packet includes an adaptation field, the adaptation field may be expanded by padding it with a sufficient number of stuffing bytes to overwrite the P- or B-picture data bytes until the I-picture boundary is reached. A flags byte is then added if one does not exist, and the adaptation_field_length is then changed to reflect the increased size of the adaptation field. If no adaptation field is present, one may be created by setting the relevant TS packet header flag, including a length byte set to the size of the adaptation field, and, as needed, a flags byte set to 0x00 followed by a sufficient number of adaptation field stuffing bytes (0xFF) until the I-picture startcode is reached.

Figure 4C:
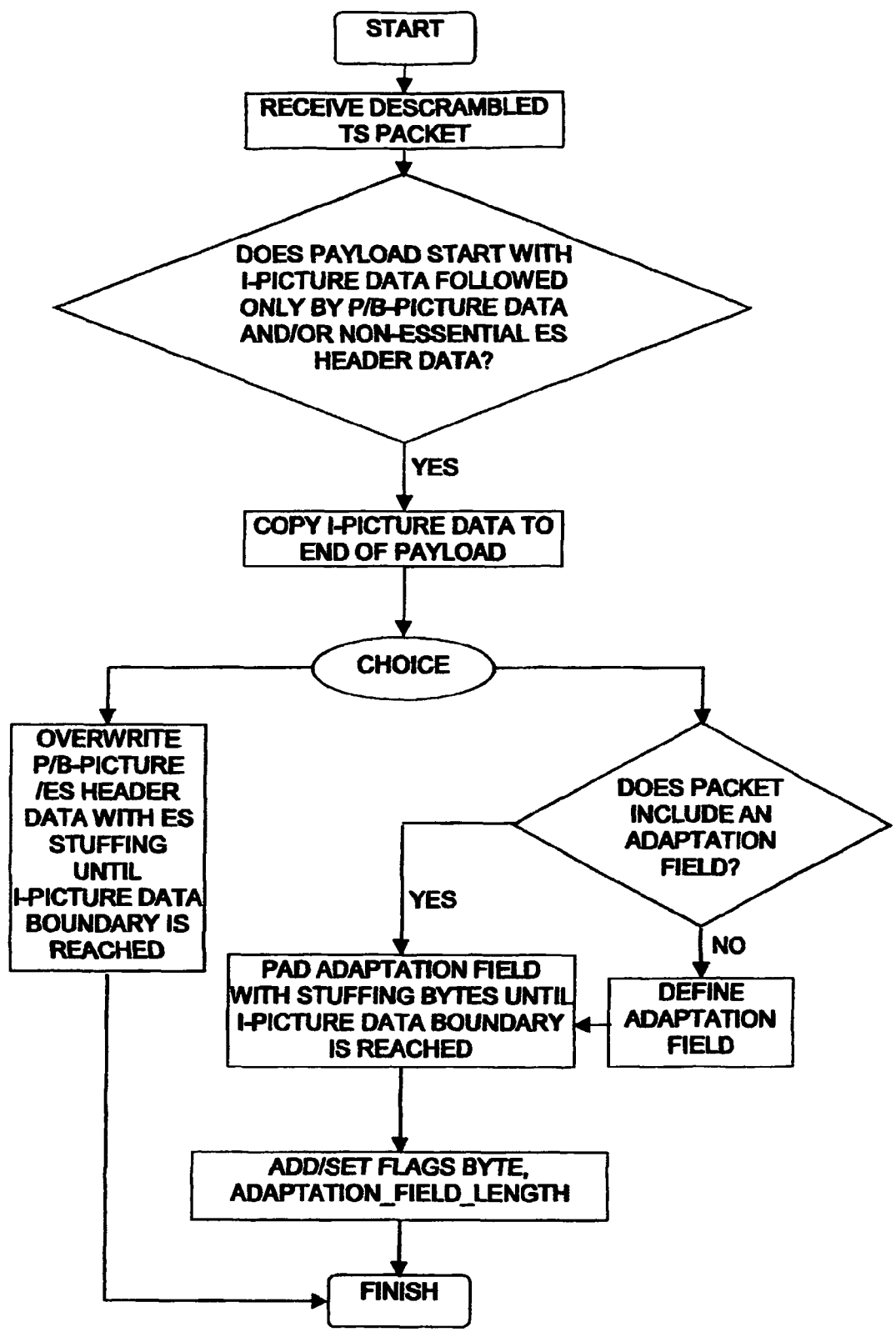

In FIG. 4C, a descrambled TS packet is received in which the TS packet payload starts with data that are designated as desirable, such as I-picture data, followed only by data that are designated as undesirable, such as P-picture and/or B-picture data and/or ES header data that are not required to maintain the validity of the MPEG stream. The I-picture data is preferably moved to the end of the payload. The data at the start of the payload that is not desired may then be eliminated by overwriting them with ES stuffing bytes (i.e., 0x00) until the I-picture boundary is reached. Alternatively, the data that are not desired may be overwritten by expanding or inserting an adaptation field and padding it with stuffing bytes (i.e., 0xFF) as described above (FIG. 4B) until the I-picture boundary is reached.

Figure 4D:
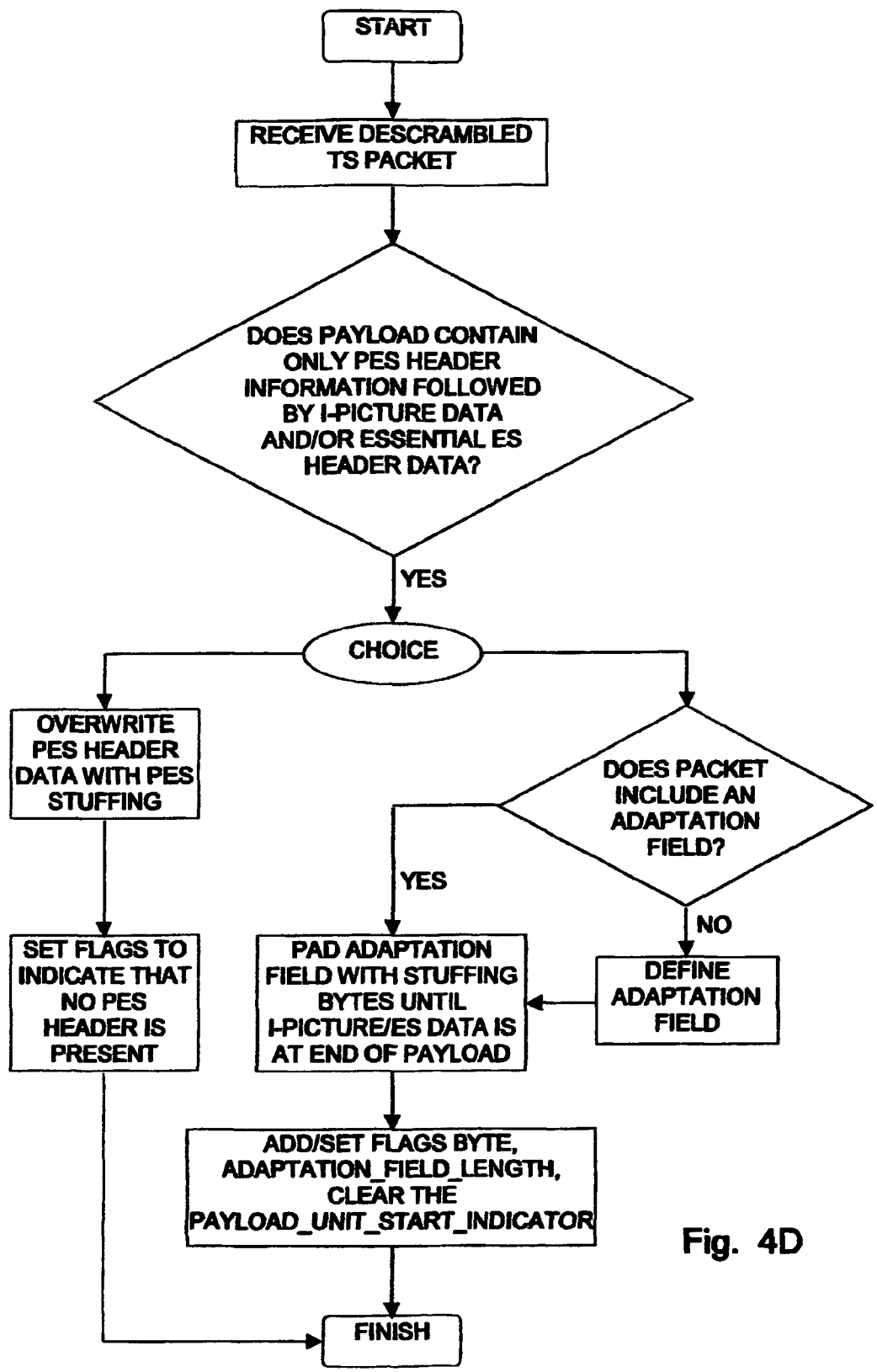

In FIG. 4D, a descrambled TS packet is received in which the TS packet payload contains only PES header information followed by data that are designated as desirable, such as I-picture data and/or ES header data that are required to maintain the validity of the MPEG stream. The PES header may be eliminated by overwriting it with an allowable number (i.e., 32 bytes in the MPEG standard) of PES header stuffing bytes (i.e., 0xFF), and by setting the flags byte of the PES header to 0x00 (i.e., setting the flags to indicate that no PES header options are present). Alternatively, the PES header may be eliminated by moving the I-picture data and/or ES header data to the end of the packet payload if the data are not already located at the end of the packet payload, by expanding or inserting an adaptation field and padding it with adaptation layer stuffing bytes (i.e., 0xFF) as described above (FIG. 4B), and by clearing the payload_unit_start_indicator in the TS header to indicate that there is no PES header present.

Figure 4E:
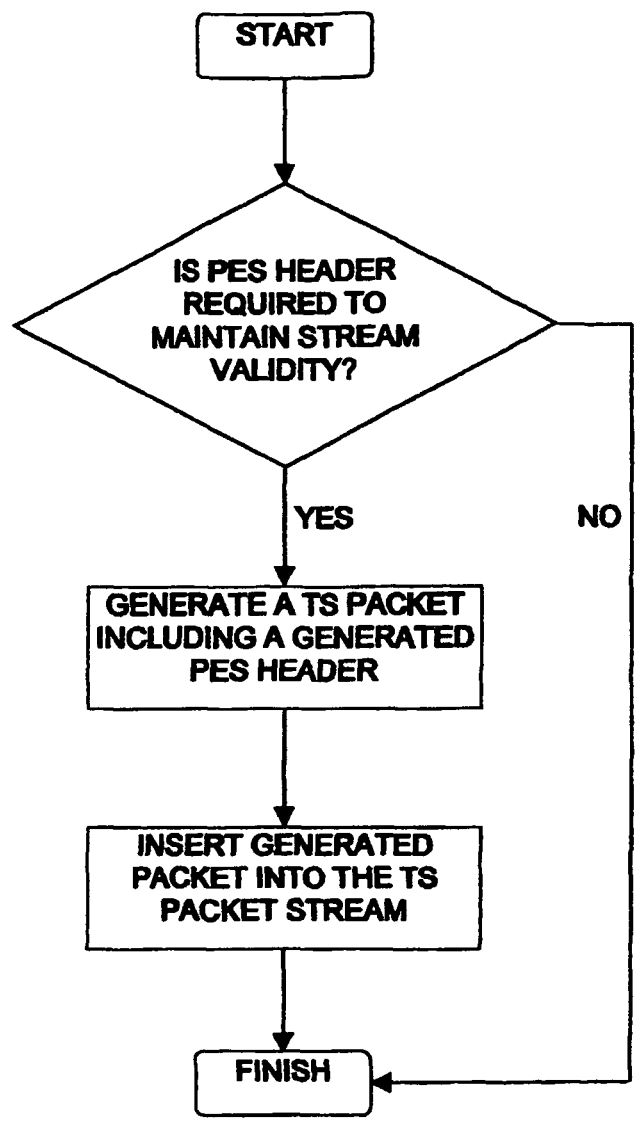

In FIG. 4E, if a PES header is required to maintain the validity of the MPEG stream, a TS packet may be generated including a generated PES header, and preferably no other payload data, and inserted into the TS packet stream. Preferably, the frame_rate_code most recently encountered in the sequence header portion of the ES header data is read. The frame_rate_code indicates the frame rate of the encoded video and is used to determine the correct display and/or decode timestamps for the generated PES header in accordance with conventional techniques. The TS packet payload may be reduced to the size required for the PES header through the use of a padded adaptation field, if required.

Figure 4F:
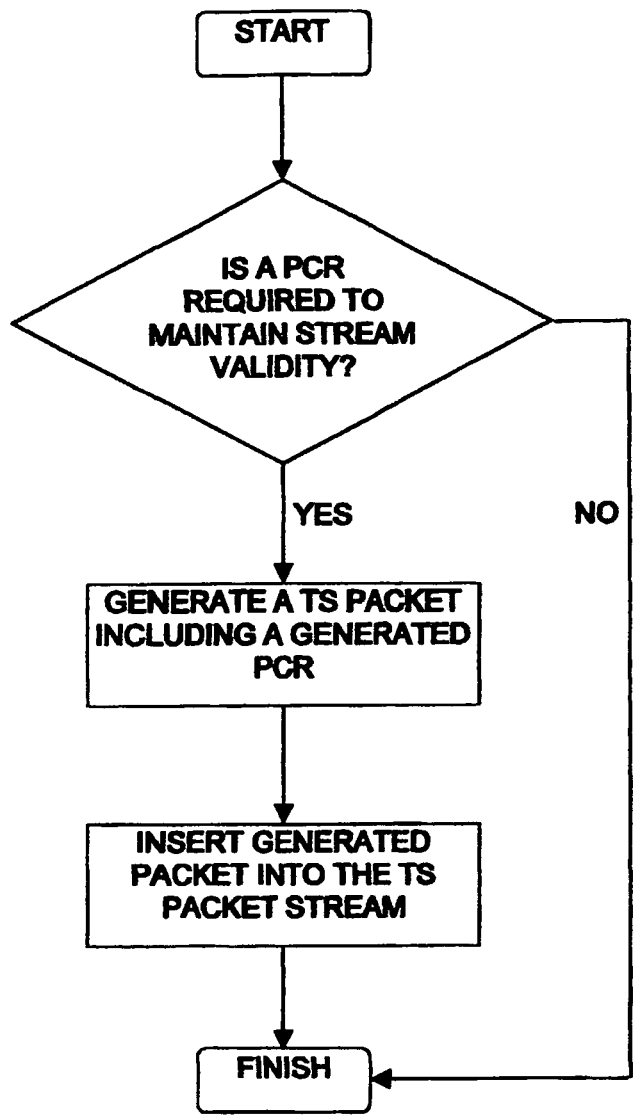

In FIG. 4F, if a Program Clock Reference (PCR) is required to maintain the validity of the MPEG stream, a TS packet may be generated including a generated PCR inserted into the TS packet stream. In order to generate a valid buffer model and to control the transmission of additional data, an accurate PCR correctly linked to the PES timestamps must be maintained. The last transmitted PCR, the number of packets sent since the last PCR was sent (and hence the number of bits sent), and the output bit rate are preferably maintained. If a constant bit-rate is in use, when a PCR value is required a "soft PCR" can be calculated by adding to the last transmitted PCR the time taken to send the number of packets transmitted at the bit-rate specified. When a PCR is transmitted, the soft PCR value is used, and the remembered PCR value is updated. Since PCRs must be transmitted frequently, a target time for the transmission of the next PCR is preferably maintained and compared with the end time of the current packet. If the current packet will finish being transmitted after the target time, then the PCR must be transmitted first. Once the correct time is identified, the PCR is transmitted.

Figure 4G:
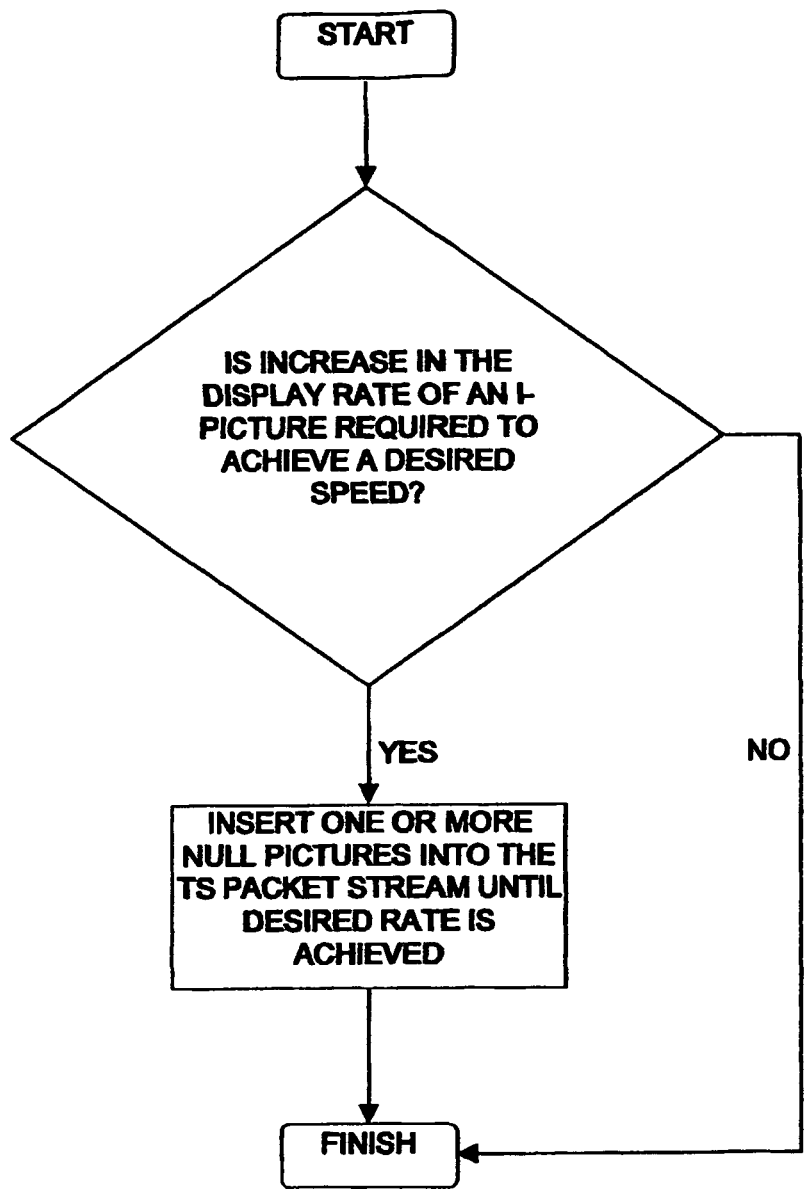

In FIG. 4G, it may be necessary to display a given I-picture more than once to achieve a given playback speed. Thus, if the repetition of an I-picture is required to achieve a desired speed, one or more null pictures may be generated in accordance with conventional techniques and inserted into the TS packet stream. Typically, a null picture repeats the presentation of the most recently encountered reference picture, which is either an I- or P-picture, and is coded as a P-picture. Preferably, the horizontal_size_value and vertical_size_value most recently encountered in the sequence header portion of the ES header data are read. When generating null pictures these values are used to ensure that the generated frames are the same size as other frames in the stream. The temporal_reference value in the null picture header is preferably incremented relative to the previously encountered temporal_reference value.

Figure 4H:
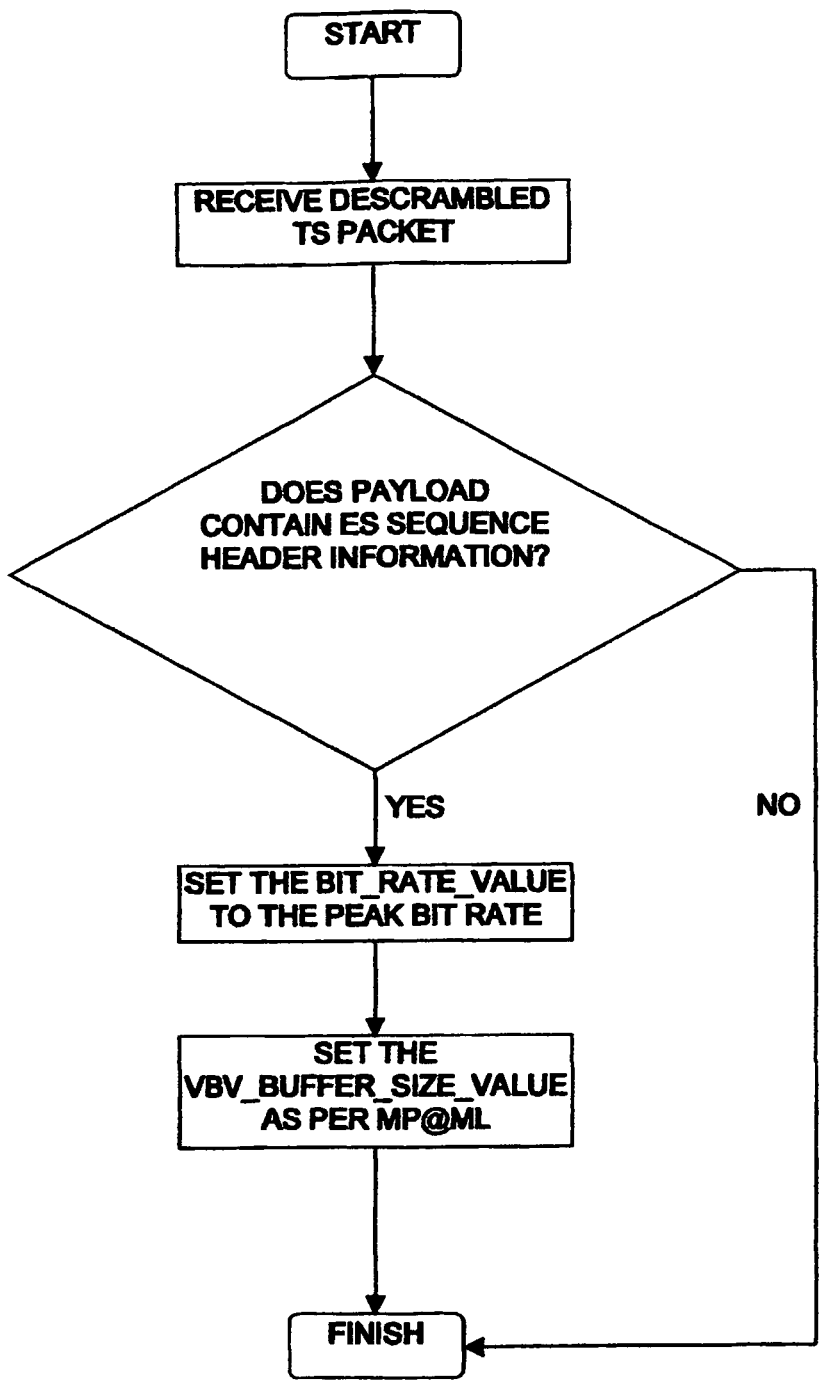

In FIG. 4H, a descrambled TS packet is received in which ES sequence header information is stored. In order to maintain the validity of the MPEG stream, the bit_rate_value and vbv_buffer_size_value of the ES sequence header are preferably changed. The bit_rate_value specifies the maximum bit rate at which the MPEG decoder buffer may operate, which, in practice, defines the peak bit rate of the stream. This value is preferably set to the peak bit rate at which the stream will be transmitted and which may be set in accordance with conventional techniques. The vbv_buffer_size_value defines the size of the decoder buffer that is required to decode the stream. This value is preferably set equal to that which is indicated for the Main Profile at Main Level (MP@ML) in accordance with conventional techniques.

Figure 4I:
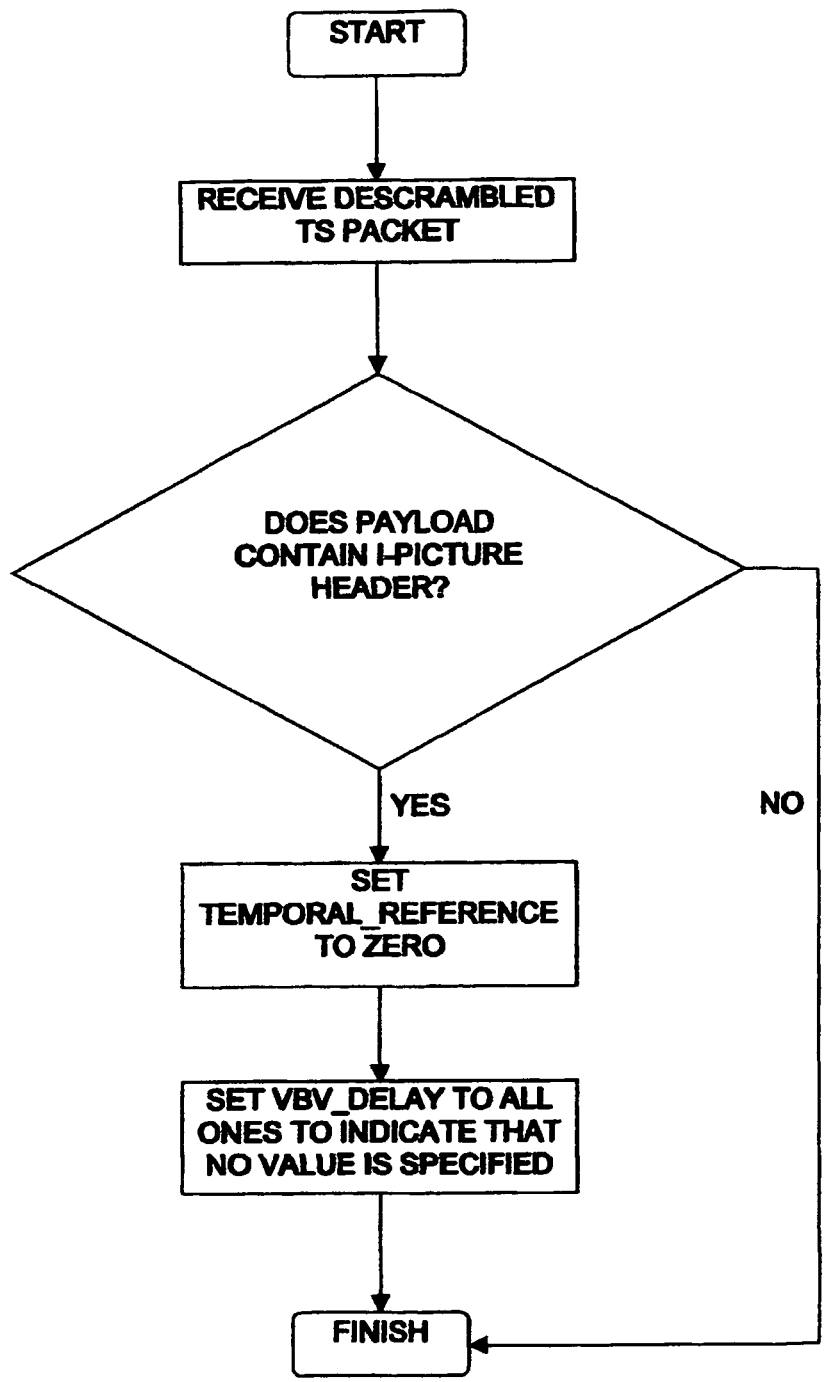

In FIG. 4I, a descrambled TS packet is received in which the picture header of an I-picture is stored. In order to maintain the validity of the MPEG stream, the temporal_reference and vbv_delay of the picture header are preferably changed. The temporal_reference defines when, in display order, the I-picture is to be displayed. The temporal_reference value in the current TS packet is preferably set to zero. The vbv_delay typically defines the length of time that the data for the current picture will remain in the decoder buffer. The value in the current TS packet is preferably set to all ones to indicate that no value is specified.

Figure 4J:
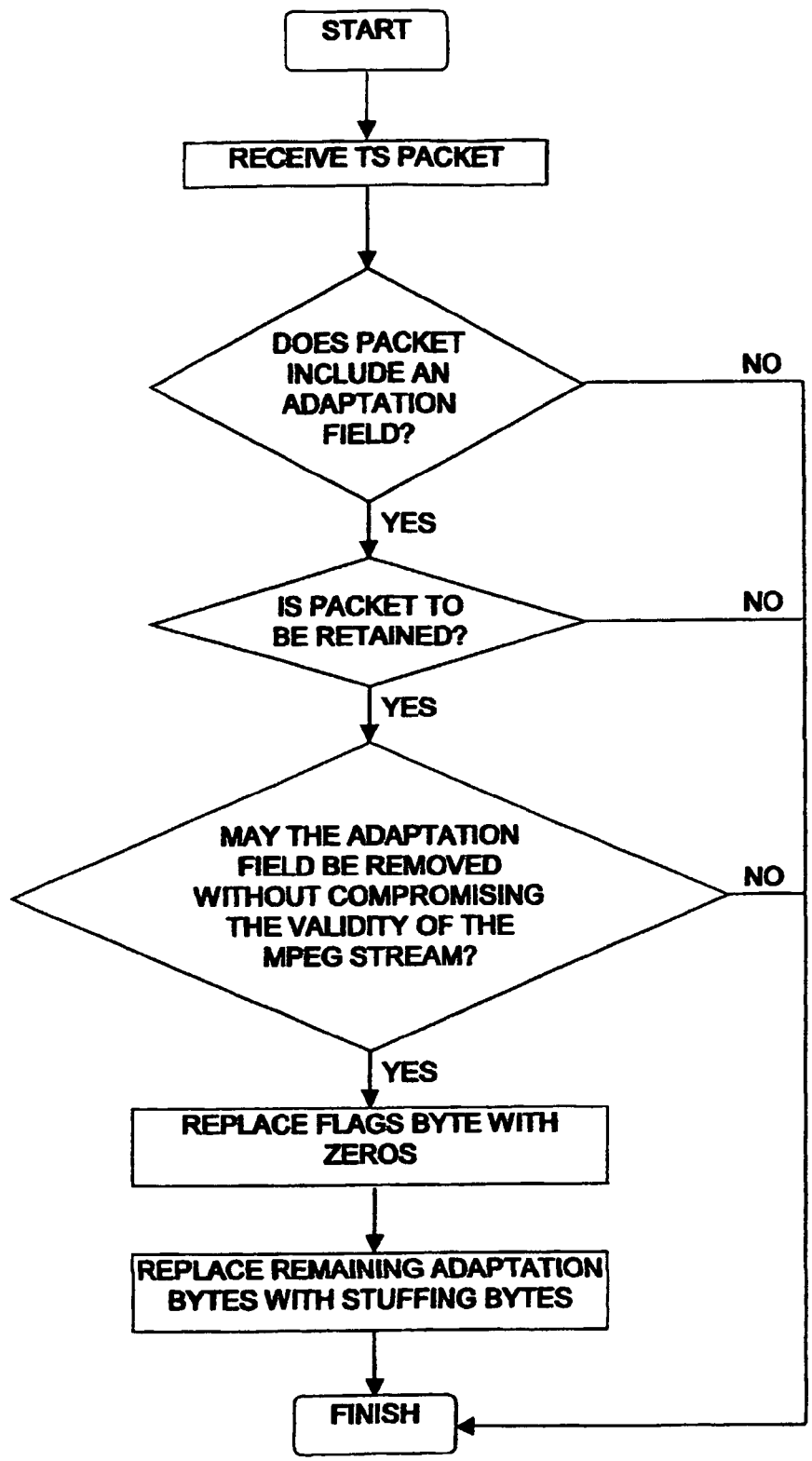

In FIG. 4J, a descrambled TS packet is received including an adaptation field. If the decision is made to retain the TS packet, and the adaptation field may be removed without compromising the validity of the MPEG stream, the flags byte (i.e., the second byte of the adaptation field) may be replaced with zeros, and all the remaining adaptation bytes may be replaced with stuffing bytes (0xff). Since adaptation fields are not scrambled, these changes may be alternatively made to the corresponding scrambled packet. If no other changes are made to the packet, the modified scrambled packet may be transmitted. Otherwise, the modified descrambled packet is transmitted.

Figure 4K:
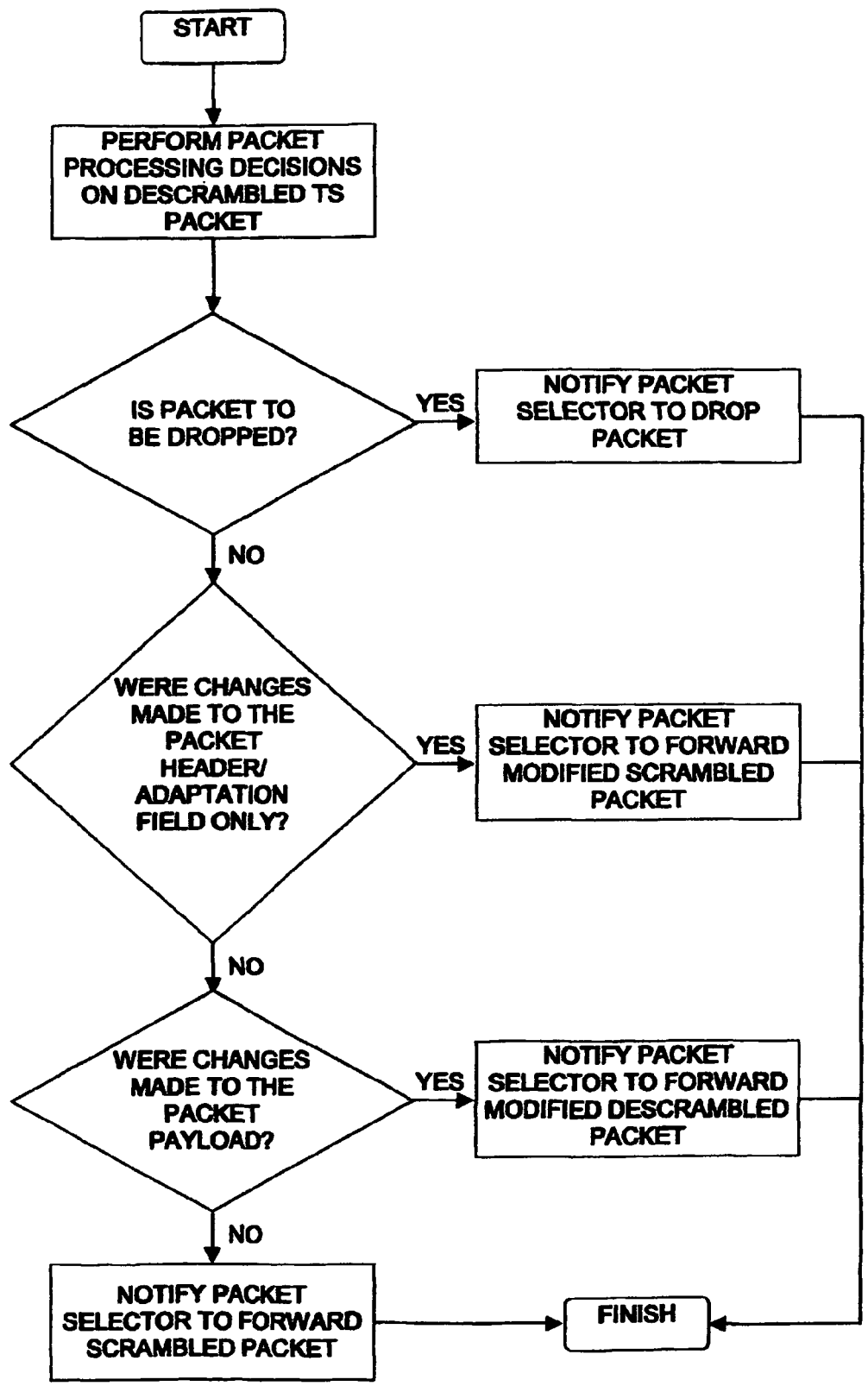
FIG. 4K is a simplified flow chart illustrating packet processing after the packet processing decisions of FIGS. 4A-4J.

In FIG. 4K, after the packet processing decisions of FIGS. 4A-4J have been made, if the TS packet is to be dropped, packet selector 304 is so notified. If the TS packet is to be forwarded, and no changes were made to the TS packet, packet selector 304 is notified to forward the scrambled version of the packet in the MPEG stream as is. If any changes where made to the descrambled packet payload, including reducing its size, packet selector 304 is notified to replace the scrambled version of the packet in the MPEG stream with the modified descrambled version. If no changes were made to the descrambled packet payload, but changes were made to the packet header, such as to the adaptation field, packet selector 304 is notified to forward the modified scrambled packet. Otherwise, packet selector 304 is notified to forward the modified descrambled packet.

Figure 5:
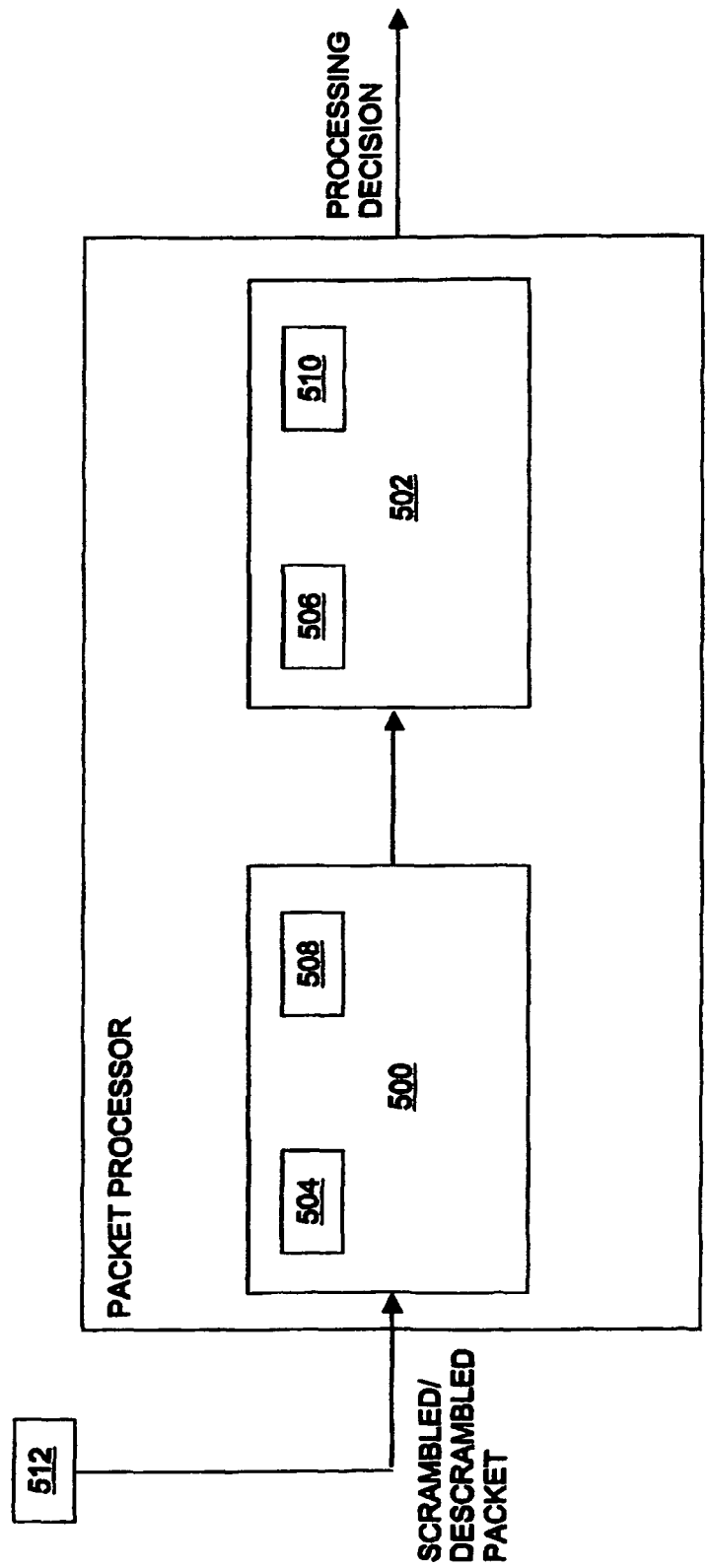
FIG. 5 is a simplified block diagram of a packet stream processing architecture, constructed and operative in accordance with a preferred embodiment of the present invention.

Reference is now made to FIG. 5, which is a simplified block diagram of a packet stream processing architecture, constructed and operative in accordance with a preferred embodiment of the present invention. The architecture of FIG. 5 may be employed to carry out the packet processing decisions of FIGS. 4A-4J. In the architecture of FIG. 5, two packet buffers 500 and 502 are respectively used to read in a current TS packet and the packet following the current packet. Since picture start codes may straddle packets, it may be necessary to look into the next packet to identify a start code that begins in the current packet or to identify whether the start code that begins in the current packet is for an I-, P-, or B-picture.

When a packet is placed into a packet buffer, a data pointer 504, 506 is preferably set to indicate where the packet payload is to be found. If the packet has no payload (e.g., it is a PCR-only packet), then the packet may be dropped and another packet may be loaded. Likewise, a flag 508, 510 may be initialized that will be used to indicate if the packet should be transmitted in scrambled or descrambled form.

To calculate the payload start, any adaptation field bytes must be skipped, which may later be removed as described hereinabove. The length of the adaptation field is specified by the first byte of the adaptation field. Next, any PES header bytes, whose presence is indicated by the payload_unit_ start_indicator flag in the TS header, should be skipped. The PES header bytes may also be removed by replacing them with adaptation field stuffing as described hereinabove. A PES header will start after any adaptation data, and its length is indicated in the ninth byte of the PES header of an audio or video stream. The remaining data in the packet represents the payload.

A PID filter 512 may be used to ensure that only TS packets with desired PIDs are processed by the stream processor. For example, where a fast-forward trick mode video stream is desired without audio, PID filter 512 may be used to filter out any TS packets with only audio data.

Figure 6:
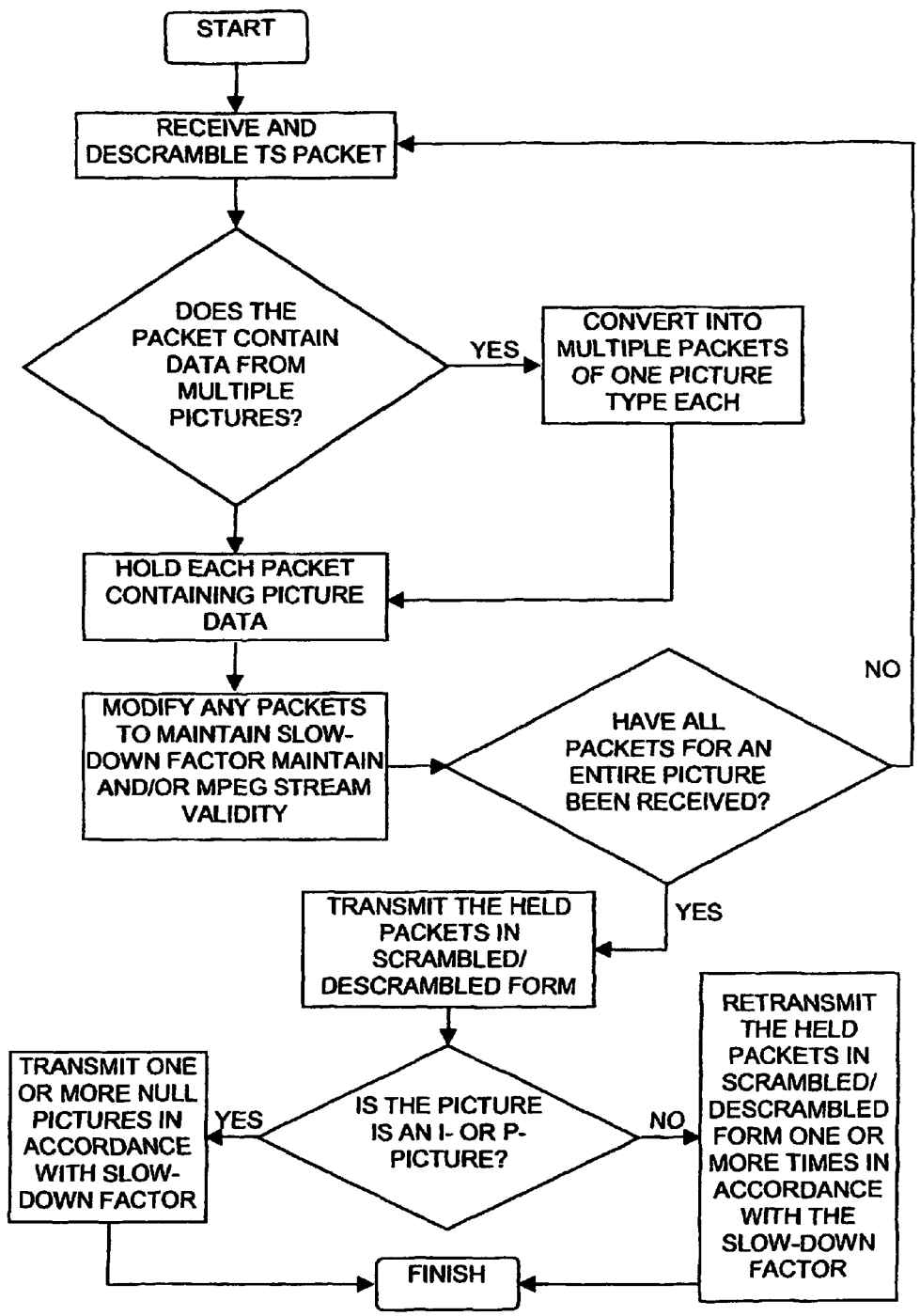
FIG. 6 is a simplified flowchart illustration of an alternate method of scrambled packet processing, operative in accordance with a preferred embodiment of the present invention.

Reference is now made to FIG. 6, which is a simplified flowchart illustration of an alternate method of scrambled packet processing, operative in accordance with a preferred embodiment of the present invention. The method of FIG. 6 is typically carried out in support of slow-motion viewing of MPEG-2 streams, in which previously transmitted pictures are caused to be displayed multiple times in accordance with a slow-down factor.

In the method of FIG. 6, a scrambled TS packet is received and descrambled, such as at descrambler 300 (FIG. 3). The descrambled packet is then examined, such as at packet processor 302, to determine whether or not the packet contains data from an I-, P-, or B-picture. If so, the packet is held, such as in a buffer, together with other packets of the same picture type until a predefined processing unit, such as an entire I-, P-, or B-picture, is formed. If a packet is received that contains data from multiple pictures, typically being the end of one picture and the beginning of another, the packet is converted into multiple packets using conventional techniques or other techniques described hereinabove, where each packet contains data from only one of the pictures. The packet that contains data belonging to the currently held picture thus completes the data for the picture.

Once packets for an entire picture are held, slow-motion may be achieved as follows. If the picture is an I- or P-picture, the packets may be transmitted once, such as at packet selector 304, followed by one or more null pictures instructing the receiver to display the picture one or more additional times in accordance with a predetermined slow-down factor. If the picture is a B-picture, all the packets for the B-picture are transmitted once, and then are retransmitted one or more times in accordance with the slow-down factor. The packets of the currently held picture may be discarded once they are no longer required for transmission.

Any of the received packets may be modified to maintain the slow-down factor maintain and/or the validity of the MPEG stream using conventional techniques or other techniques described hereinabove. For example, the temporal_value is preferably replaced with a multiple of the original temporal_value which represents the slow-down factor, and the vbv_delay of all the headers is preferably replaced with ones as described hereinabove. Packets that have been modified are preferably transmitted in descrambled form, while packets that have not been modified may be transmitted in either scrambled or descrambled form.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, it is appreciated that the methods and apparatus described herein may be readily implemented in hardware or software using conventional techniques.

While the present invention has been described with reference to one or more specific embodiments, the description is intended to be illustrative of the invention as a whole and is not to be construed as limiting the invention to the embodiments shown and described herein. It is appreciated that the true spirit and scope of the present invention includes both combinations and subcombinations of the various features described herein, as well as variations and modifications thereof which would occur to persons skilled in the art. For example, the modified packet stream of the present invention may be scrambled and/or encrypted using conventional techniques prior to transmission.

What is claimed is:

1. A method for processing a packet-based scrambled stream, the method comprising:
receiving a plurality of scrambled packets in a packet stream;
descrambling any of said scrambled packets; and
transmitting a modified packet stream comprising at least one of said descrambled packets and at least one of said scrambled packets.

2. A method according to claim 1 and further comprising moving a data segment within a payload of any of said packets from a first location within said payload to a second location within said payload.

3. A method according to claim 2 and further comprising overwriting at least a portion of said first location.

4. A method according to claim 3 wherein said overwriting step comprises overwriting with any of zeroes, stuffing bytes, and padding bytes.

5. A method according to claim 1 and further comprising overwriting data designated as undesirable within a payload of any of said packets.

6. A method according to claim 5 wherein any of said overwriting steps comprises overwriting with any of zeroes, stuffing bytes, and padding bytes.

7. A method according to claim 1 and further comprising changing the value of at least one byte of any of said packets in accordance with a predefined processing decision.

8. A method according to claim 7 wherein said changing step comprises changing said byte in any of said descrambled packets.

9. A method according to claim 1 and further comprising changing the value of at least one bit of any of said packets in accordance with a predefined processing decision.

10. A method according to claim 9 wherein said changing step comprises changing said bit in any of said descrambled packets.

11. A method according to claim 1 and further comprising dropping any of said packets from said received packet stream in accordance with a predefined processing decision.

12. A method according to claim 1 wherein said receiving step comprises receiving a video stream comprising a plurality of independent video elements and at least one video element that is dependent on any of said independent video elements, and further comprising removing any of said dependent video elements from said video stream, thereby resulting in said modified packet stream.

13. A method according to claim 12 and further comprising modifying any of said video elements to maintain the validity of said processed video stream with respect to a protocol.

14. A method according to claim 1 and further comprising holding any of said packets until said packets collectively comprise a predefined processing unit, and wherein said transmitting step comprises transmitting said held packets comprising said processing unit.

15. A method according to claim 1 and further comprising holding any of said packets until said packets collectively comprise the data of at least one picture, and wherein said transmitting step comprises transmitting said held packets comprising the data of said picture.

16. A method according to claim 15 and further comprising retransmitting said held packets at least one additional time.

17. A method according to claim 16 wherein said retransmitting step comprises retransmitting a sufficient number of times in order to effect a predetermined slow-down factor of a display of said picture.

18. A method according to claim 17 and further comprising modifying any of said packets to maintain said slow-down factor.

19. A method according to claim 16 wherein said retransmitting step comprises retransmitting where said picture is an MPEG-protocol B-picture.

20. A method according to claim 15 and further comprising transmitting a sufficient number of null pictures in order to effect a predetermined slow-down factor of a display of said picture.

21. A method according to claim 20 wherein said transmitting null pictures step comprises transmitting where said picture is either of an MPEG-protocol P-picture and an MPEG-protocol I-picture.

22. A method according to claim 15 and further comprising converting any of said packets including data from multiple pictures into a plurality of individual packets, each including data from only one of said multiple pictures.

23. A method according to claim 1 and further comprising modifying any of said packets to maintain the validity of said packet stream with respect to an MPEG protocol.

24. A method according to claim 1, comprising, after the descrambling, a further step of processing the plurality of packets to determine, for each packet, whether (a) to drop the packet, (b) to forward the packet as-is in scrambled or descrambled form, (c) to alter and forward the scrambled or descrambled packet or (d) to insert the scrambled or descrambled packet into the modified packet stream, said processing step (a) comprising a determination as to whether the packet contains only undesirable data selected from the group consisting of P-picture data, B-picture data, PBS header information, ES header data or a combination thereof and, if so, dropping the packet.

25. A method for providing a processed MPEG video stream, the method comprising:
   receiving an MPEG video stream as a plurality of scrambled packets comprising data that are designated as desirable data and data that are designated as undesirable data;
   descrambling any of said scrambled packets; and
   transmitting a processed MPEG video stream comprising at least one of said descrambled packets and at least one of said scrambled packets.

26. A method according to claim 25 and further comprising removing any of said undesirable data from any of said descrambled packets, thereby resulting in a modified descrambled packet, and wherein said transmitting step comprises transmitting said modified descrambled packet.

27. A method according to claim 25 wherein the method further comprises designating as desirable data any of I-picture data and header data that is necessary to maintain the validity of said processed MPEG video stream with respect to an MPEG protocol.

28. A method according to claim 25 wherein the method further comprises designating as undesirable data any of P-picture data, B-picture data, and header data that not is necessary to maintain the validity of said processed MPEG video stream with respect to an MPEG protocol.

29. A method according to claim 25 and further comprising modifying any header information in said processed MPEG video stream to maintain the validity of said processed MPEG video stream with respect to an MPEG protocol.

30. A method according to claim 25 wherein said removing step comprises dropping any of said packets having only said undesirable data.

31. A method according to claim 25 wherein said removing step comprises overwriting at least a portion of said undesirable data with any of zeroes, stuffing bytes, and padding bytes.

32. A method according to claim 25 wherein said removing step comprises padding an adaptation field within any of said packets having said undesirable data with a sufficient number of bytes to overwrite at least a portion of said undesirable data.

33. A method according to claim 25 wherein said removing step comprises moving said desirable data within a payload of any of said packets from a first location within said payload to a second location within said payload.

34. A method according to claim 33 wherein said removing step comprises overwriting at least a portion of said first location.

35. A method according to claim 33 wherein said removing step comprises overwriting at least a portion of said first location with any of zeroes, stuffing bytes, and padding bytes.

36. A method according to claim 33 wherein said removing step comprises padding an adaptation field within said packet with a sufficient number of bytes to overwrite at least a portion of said first location.

37. A method according to claim 25 wherein said removing step comprises:
   overwriting a PES header in any of said packets with PES header stuffing bytes, where said PES header is followed by said desirable data; and
   setting a flags byte of said PES header to indicate that no PES header options are present.

38. A method according to claim 25 wherein the method further comprises generating and inserting into said processed MPEG video stream a TS packet including a generated PES header where said PES header is required to maintain the validity of said processed MPEG video stream with respect to an MPEG protocol.

39. A method according to claim 25 wherein the method further comprises generating and inserting into said processed MPEG video stream a TS packet including a generated PCR where said PCR is required to maintain the validity of said processed MPEG video stream with respect to an MPEG protocol.

40. A method according to claim 25 wherein the method further comprises generating and inserting a sufficient number of null pictures into said processed MPEG video stream to achieve a predefined playback speed.

41. A method according to claim 25 wherein said removing step comprises, where any of said packets includes an ES sequence header:
   setting a bit_rate_value of said ES sequence header to a peak bit rate at which said processed MPEG video stream will be transmitted; and
   setting a vbv_buffer_size_value of said ES sequence header equal to that which is indicated for a Main Profile at Main Level.

42. A method according to claim 25 wherein said removing step comprises, where any of said packets includes a picture header of an I-picture:

setting a temporal_reference value in said packet to zero
setting a vbv_delay in said packet to indicate that no value is specified.

43. A method according to claim 25 wherein said removing step comprises, where any of said packets includes an adaptation field that may be removed without compromising the validity of the said processed MPEG video stream:
replacing a flags byte of said adaptation field with zeros; and
replacing all remaining bytes of said adaptation field with stuffing bytes.

44. A scrambled packet stream processor comprising:
a descrambler operative to descramble any packet in a scrambled packet stream;
a packet processor operative to perform at least one packet processing decision upon any of said packets resulting in any of generating a packet, deciding to drop any of said packets, altering any of said packets, and deciding to forward any of said packets from said stream; and
a packet selector responsive to said decision and operative to perform any of inserting said generated packet into said stream, dropping any of said packets, and forwarding any of said packets, wherein said packet selector forwards at least one of said scrambled packets and at least one descrambled packet,
wherein said scrambled packet stream processor is at least partly implemented in hardware.

45. Apparatus according to claim 44 and further comprising modifying any of said packets to maintain the validity of said packet stream with respect to an MPEG protocol.

46. Apparatus for processing a packet-based scrambled stream comprising:
a descrambler operative to receive a plurality of scrambled packets in a packet stream and descramble any of said scrambled packets; and
a packet selector operative to transmit a modified packet stream comprising at least one of said descrambled packets and at least one of said scrambled packets,
wherein said apparatus is at least partly implemented in hardware.

47. Apparatus according to claim 46 and further comprising a packet processor operative to modify any of said packets.

48. Apparatus according to claim 47 wherein said packet processor is operative to move a data segment within a payload of any of said packets from a first location within said payload to a second location within said payload.

49. Apparatus according to claim 48 wherein said packet processor is operative to overwrite at least a portion of said first location.

50. Apparatus according to claim 49 wherein said packet processor is operative to overwrite with any of zeroes, stuffing bytes, and padding bytes.

51. Apparatus according to claim 47 wherein said packet processor is operative to overwrite data designated as undesirable within a payload of any of said packets.

52. Apparatus according to claim 51 wherein said packet processor is operative to overwrite with any of zeroes, stuffing bytes, and padding bytes.

53. Apparatus according to claim 47 wherein said packet processor is operative to change the value of at least one byte of any of said packets in accordance with a predefined processing decision.

54. Apparatus according to claim 53 wherein said packet processor is operative to change said byte in any of said descrambled packets.

55. Apparatus according to claim 47 wherein said packet processor is operative to change the value of at least one bit of any of said packets in accordance with a predefined processing decision.

56. Apparatus according to claim 55 wherein said packet processor is operative to change said bit in any of said descrambled packets.

57. Apparatus according to claim 47 wherein said packet processor is operative to drop any of said packets from said received packet stream in accordance with a predefined processing decision.

58. Apparatus according to claim 47 wherein said stream comprises a plurality of independent video elements and at least one video element that is dependent on any of said independent video elements, and wherein said packet processor is operative to remove any of said dependent video elements from said video stream, thereby resulting in said modified packet stream.

59. Apparatus according to claim 58 wherein said packet processor is operative to modify any of said video elements to maintain the validity of said processed video stream with respect to a protocol.

60. Apparatus according to claim 47 wherein said packet processor is operative to hold any of said packets until said packets collectively comprise a predefined processing unit, and wherein said packet selector is operative to transmit said held packets comprising said processing unit.

61. Apparatus according to claim 47 wherein said packet processor is operative to hold any of said packets until said packets collectively comprise the data of at least one picture, and wherein said packet selector is operative to transmit said held packets comprising the data of said picture.

62. Apparatus according to claim 61 wherein said packet selector is operative to retransmit said held packets at least one additional time.

63. Apparatus according to claim 61 wherein said packet selector is operative to retransmit where said picture is an MPEG-protocol B-picture.

64. Apparatus according to claim 61 wherein said packet selector is operative to retransmit said held packets a sufficient number of times in order to effect a predetermined slow-down factor of a display of said picture.

65. Apparatus according to claim 64 wherein said packet processor is operative to modify any of said packets to maintain said slow-down factor.

66. Apparatus according to claim 61 wherein said packet selector is operative to transmit a sufficient number of null pictures in order to effect a predetermined slow-down factor of a display of said picture.

67. Apparatus according to claim 66 wherein said packet selector is operative to transmit where said picture is either of an MPEG-protocol P-picture and an MPEG-protocol I-picture.

68. Apparatus according to claim 61 wherein said packet processor is operative to convert any of said packets including data from multiple pictures into a plurality of individual packets, each including data from only one of said multiple pictures.

69. Apparatus for providing a processed MPEG video stream comprising:
a descrambler operative to receive an MPEG video stream as a plurality of scrambled packets comprising data that are designated as desirable data and data that are designated as undesirable data and descramble any of said scrambled packets; and a packet selector operative to transmit a processed MPEG video stream comprising at least one of said descrambled packets and at least one of said scrambled packets, wherein said apparatus is at least partly implemented in hardware.

70. Apparatus according to claim 69 and further comprising a packet processor operative to remove any of said undesirable data from any of said descrambled packets, thereby resulting in a modified descrambled packet, and wherein said packet selector is operative to transmit said modified descrambled packet.

71. Apparatus according to claim 69 wherein said desirable data comprises any of I-picture data and header data that is necessary to maintain the validity of said processed MPEG video stream with respect to an MPEG protocol.

72. Apparatus according to claim 69 wherein said undesirable data comprises any of P-picture data, B-picture data, and header data that not is necessary to maintain the validity of said processed MPEG video stream with respect to an MPEG protocol.

73. Apparatus according to claim 69 wherein said packet processor is operative to modify any header information in said processed MPEG video stream to maintain the validity of said processed MPEG video stream with respect to an MPEG protocol.

74. Apparatus according to claim 69 wherein said packet processor is operative to drop any of said packets having only said undesirable data.

75. Apparatus according to claim 69 wherein said packet processor is operative to overwrite at least a portion of said undesirable data with any of zeroes, stuffing bytes, and padding bytes.

76. Apparatus according to claim 69 wherein said packet processor is operative to pad an adaptation field within any of said packets having said undesirable data with a sufficient number of bytes to overwrite at least a portion of said undesirable data.

77. Apparatus according to claim 69 wherein said packet processor is operative to move said desirable data within a payload of any of said packets from a first location within said payload to a second location within said payload.

78. Apparatus according to claim 77 wherein said packet processor is operative to overwrite at least a portion of said first location.

79. Apparatus according to claim 77 wherein said packet processor is operative to overwrite at least a portion of said first location with any of zeroes, stuffing bytes, and padding bytes.

80. Apparatus according to claim 77 wherein said packet processor is operative to pad an adaptation field within said packet with a sufficient number of bytes to overwrite at least a portion of said first location.

81. Apparatus according to claim 69 wherein said packet processor is operative to:
overwrite a PES header in any of said packets with PES header stuffing bytes, where said PES header is followed by said desirable data; and
set a flags byte of said PES header to indicate that no PES header options are present.

82. Apparatus according to claim 69 wherein said packet processor is operative to generate and insert into processed MPEG video stream a TS packet including a generated PES header where said PES header is required to maintain the validity of said processed MPEG video stream with respect to an MPEG protocol.

83. Apparatus according to claim 69 wherein said packet processor is operative to generate and insert into said processed MPEG video stream a TS packet including a generated PCR where said PCR is required to maintain the validity of said processed MPEG video stream with respect to an MPEG protocol.

84. Apparatus according to claim 69 wherein said packet processor is operative to generate and insert a sufficient number of null pictures into said processed MPEG video stream to achieve a predefined playback speed.

85. Apparatus according to claim 69 wherein said packet processor is operative to, where any of said packets includes an ES sequence header:
set a bit_rate_value of said ES sequence header to a peak bit rate at which said processed MPEG video stream will be transmitted; and
set a vbv_buffer_size_value of said ES sequence header equal to that which is indicated for a Main Profile at Main Level.

86. Apparatus according to claim 69 wherein said packet processor is operative to, where any of said packets includes a picture header of an I-picture:
set a temporal_reference value in said packet to zero
set a vbv_delay in said packet to indicate that no value is specified.

87. Apparatus according to claim 69 wherein said packet processor is operative to, where any of said packets includes an adaptation field that may be removed without compromising the validity of the said processed MPEG video stream:
replace a flags byte of said adaptation field with zeros; and
replace all remaining bytes of said adaptation field with stuffing.

88. A method for processing a packet-based scrambled input stream, comprising digital video data, to produce a packet-based partially-descrambled output stream, the method comprising:
receiving a plurality of scrambled packets in a packet stream;
descrambling the plurality of scrambled packets to produce a plurality of descrambled packets;
for each one descrambled packet of said plurality of descrambled packets, performing the following:
determining whether said one descrambled packet is to be dropped and, if so, dropping said packet from inclusion in said output stream;
determining whether changes are to be made only to the nonscrambled header and/or adaptation field of said one descrambled packet and, if so, making said changes and including in said output stream a scrambled packet from said input stream corresponding to said one descrambled packet, wherein the scrambled packet includes the changed header and/or adaptation field;
determining whether changes are to be made to the payload of said one descrambled packet and, if so, making said changes to the payload to produce a modified descrambled packet and including in said output stream the modified descrambled packet; and
determining whether no changes are to be made to any of the payload, the header, and the adaptation field of said one descrambled packet and, if no changes are to be made, including in said output stream a scrambled packet from said input stream corresponding to said one descrambled packet, and
transmitting said output stream, said output stream comprising at least one of said descrambled packets and at least one of said scrambled packets.

89. A method according to claim 88, wherein the step of determining whether the descrambled packet is to be dropped comprises a determination as to whether the packet contains only undesirable data selected from the group consisting of P-picture data, B-picture data, PBS header information, ES header data or a combination thereof and, if so, dropping the packet.

\* \* \* \* \*